United States Patent [19]

Yonehara

[11] Patent Number: 4,823,344
[45] Date of Patent: Apr. 18, 1989

[54] REMOTE TEST CIRCUIT FOR CHANNEL TERMINAL

[75] Inventor: Akifumi Yonehara, Tokyo, Japan

[73] Assignee: NEC Corporation, Tokyo, Japan

[21] Appl. No.: 21,933

[22] Filed: Mar. 5, 1987

[30] Foreign Application Priority Data

Mar. 6, 1986 [JP] Japan .................................. 61-47240

[51] Int. Cl.$^4$ ........................ G01R 31/28; H04B 3/46
[52] U.S. Cl. ........................................ 371/22; 375/10
[58] Field of Search ..................... 371/22; 370/14, 15; 379/5; 375/10

[56] References Cited

U.S. PATENT DOCUMENTS

| | | | |
|---|---|---|---|
| 3,943,305 | 3/1976 | Hagedorn | 371/22 |
| 4,042,794 | 8/1977 | Lima et al. | 375/10 |
| 4,271,513 | 6/1981 | Maejima et al. | 371/22 |
| 4,271,514 | 6/1981 | Parras et al. | 371/22 |
| 4,547,633 | 10/1985 | Szechenyi | 371/22 X |
| 4,630,268 | 12/1986 | Rodenbaugh | 371/22 |
| 4,631,719 | 12/1986 | Huffman et al. | 370/15 |
| 4,675,862 | 6/1987 | Banzi, Jr. et al. | 370/15 |

Primary Examiner—Charles E. Atkinson
Attorney, Agent, or Firm—Foley & Lardner, Schwartz, Jeffery, Schwaab, Mack, Blumenthal & Evans

[57] ABSTRACT

A remote test circuit for testing the performance of a channel terminal which is applicable even to multi-point connections such as 1:N communication. The circuit sets up a return path only through a particular channel terminal whose address is designated, thereby rendering that channel terminal active.

4 Claims, 5 Drawing Sheets

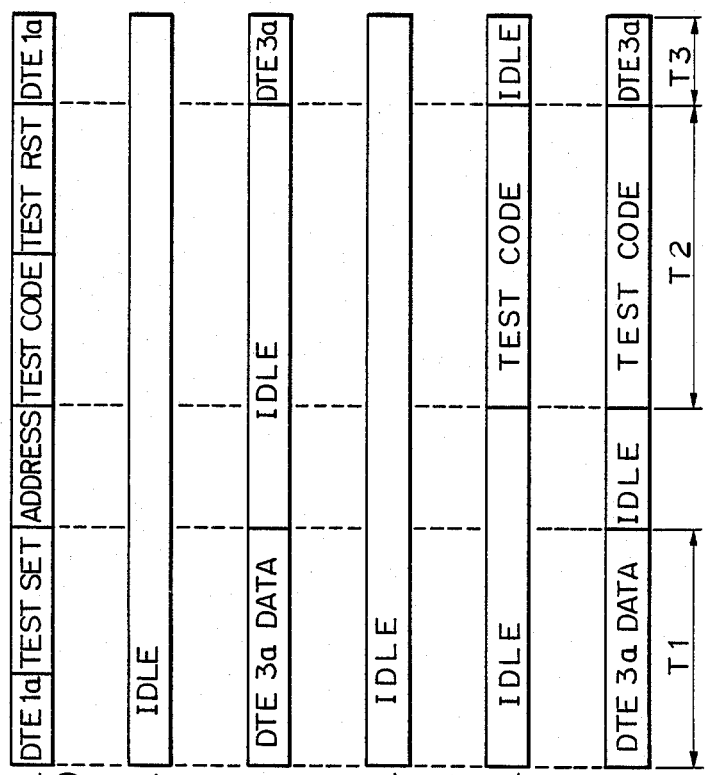

REMOTE TEST CIRCUIT FOR CHANNEL TERMINAL

BACKGROUND OF THE INVENTION

The present invention relates to a circuit for testing the performance of a channel terminal and, more particularly, to a remote test circuit for controlling only one of multiple channel terminals whose address is designated into a return test mode to make it active.

Heretofore, a remote test on a channel terminal of the type described has been performed by setting up a return path. A remote test circuit built in a channel terminal consists of a return set signal detecting circuit and a return setting switch. In response to a detection output of the detecting circuit, the switch is controlled to form a return path.

A problem with the prior art remote test circuit as stated above is that in the case of multi-point connections as typified by 1:N (=4) communication it is impossible for a particular channel terminal to be designated for a test.

SUMMARY OF THE INVENTION

It is therefore an object of the present invention to provide a remote test circuit which causes only one channel terminal whose address is designated to be brought into a return test mode and, thereby, made active.

It is another object of the present invention to provide a generally remote test circuit for a channel terminal.

A remote test circuit for testing the performance of a channel terminal of the present invention comprises a test start signal detecting circuit for detecting a test mode set signal, an own address signal detecting circuit for detecting an address which is identical with an own address, and a transmit data mode control circuit for controlling a transmit data mode to an idle state in response to a detection output of the test start signal detecting circuit, and causing the transmit data mode into an active state and setting up a test mode in response to a detection output of the own address signal detecting means.

The above and other objects, features and advantages of the present invention will become more apparent from the following detailed description taken with the accompanying drawings.

BRIEF DESCRIPTION OF THE DRAWINGS

FIG. 5A to 5F are timing charts demonstrating the operation of the system as shown in FIG. 1.

DESCRIPTION OF THE PREFERRED EMBODIMENT

Figure 1:
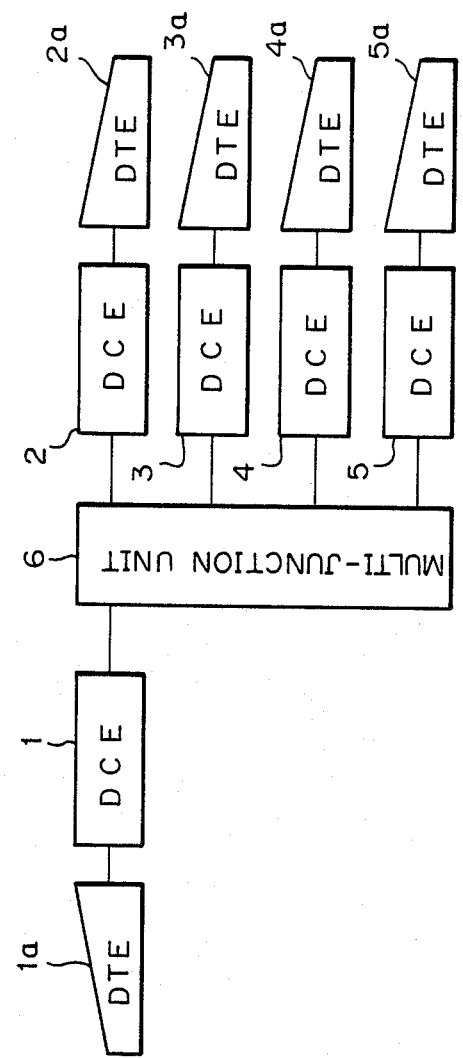
FIG. 1 is a block diagram showing an example of multi-point connections of channel terminals.

Referring to FIG. 1 of the drawings, an exemplary multipoint connection of channel terminals is shown. Specifically, there are shown data channel ends (DCE) 1 to 5, and data terminal ends (DTE) 1a to 5a which are respectively associated with the DCEs 1 to 5. Addresses "1" to "5" are assigned to the DCEs 1 to 5 with the DTEs 1a to 5a, respectively. The DTE 1a and DCE 1 and the DTEs 2a to 5a and DCEs 2 to 5 are interconnected via a multi-junction unit 6. In a usual communication mode, data may be interchanged between the DTEs 1a to 5a which are respectively connected to the DECs 1 to 5. A signal transmitted from the DCE 1 which is associated with the DTE 1a, or master DTE, is delivered simultaneously to the DCEs 2 to 5 which are associated with the DTEs 2a to 5a, or slave DETs, by the multi-junction unit 6. On the other hand, among signals transmitted from the DCEs 2 to 5 associated with the slave DTEs 2a to 5a, a signal from an active one of the DCEs is sent by the multi-junction unit 6 to the DCE 1 which is associated with the master DTE 1a. When two or more of the DCEs 2 to 5 are active, a signal to be sent to the DCE 1 is selected on the basis of a predetermined priority order.

Figure 2:
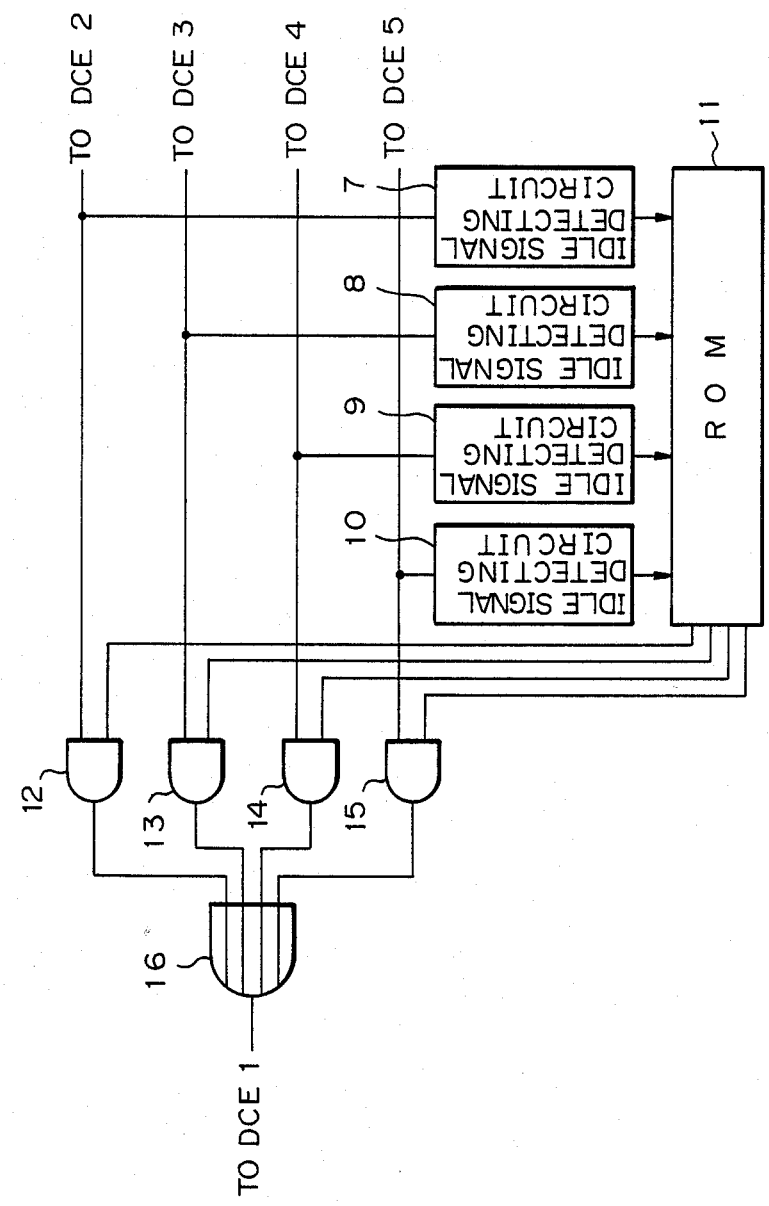
FIG. 2 is a diagram showing a specific construction of a multi-junction unit as shown in FIG. 1.

Referring to FIG. 2, a specific construction of the multi-junction unit 6 is shown. As shown, the unit 6 comprises idle signal detecting circuits 7 to 10 which are respectively connected to the DCEs 2 to 5, a read only memory (ROM) adapted to store outputs of the circuits 7 to 10, AND gates 12 to 15 having input terminals which are respectively connected to the DCEs 2 to 5, and an OR gate 16 to which the outputs of the AND gates 12 to 15 are coupled. The other output terminals of the AND gates 12 to 15 are connected to the ROM 11. The output terminal of the OR gate 16 is connected to the DCE 1. In this construction, the input addresses are implemented with the outputs of the idle signal detecting circuits 7 to 10, the output of the ROM 11 being used to control the AND gates 12 to 15. The ROM 11 stores a table which is such that when no idle signal is detected, the slave terminals are connected to the master terminal according to a predetermined priority order; when all of the idle signals are detected, the idle signal from a predetermined one of the slave terminals is transmitted to the master terminal; when the idle signal from only one of the slave terminals is not detected, that particular slave terminal is connected to the master terminal; and the idle signals from two or three of the slave terminals are not detected, they are connected to the master terminal according to the predetermined priority order.

In the multi-point connection as described above, when the DCE 1 has set a return in the DCE 5, for example, the resultant return set signal from the DCE 1 is delivered simultaneously to all the DCEs 2 to 5 resulting that a return is set not only in the DCE 5 but also in the DCEs 2 to 4. Then, the multi-junction unit 6 concludes that all the DCEs 2 to 5 have become active at a time. Under this condition, the signal sent to the DCE 1 is a one which is related to the control of the unit 6 and not a one which is returned from the DCE in question. In this manner, a remote test has been impracticable in the case of 1:N communication.

Figure 3:
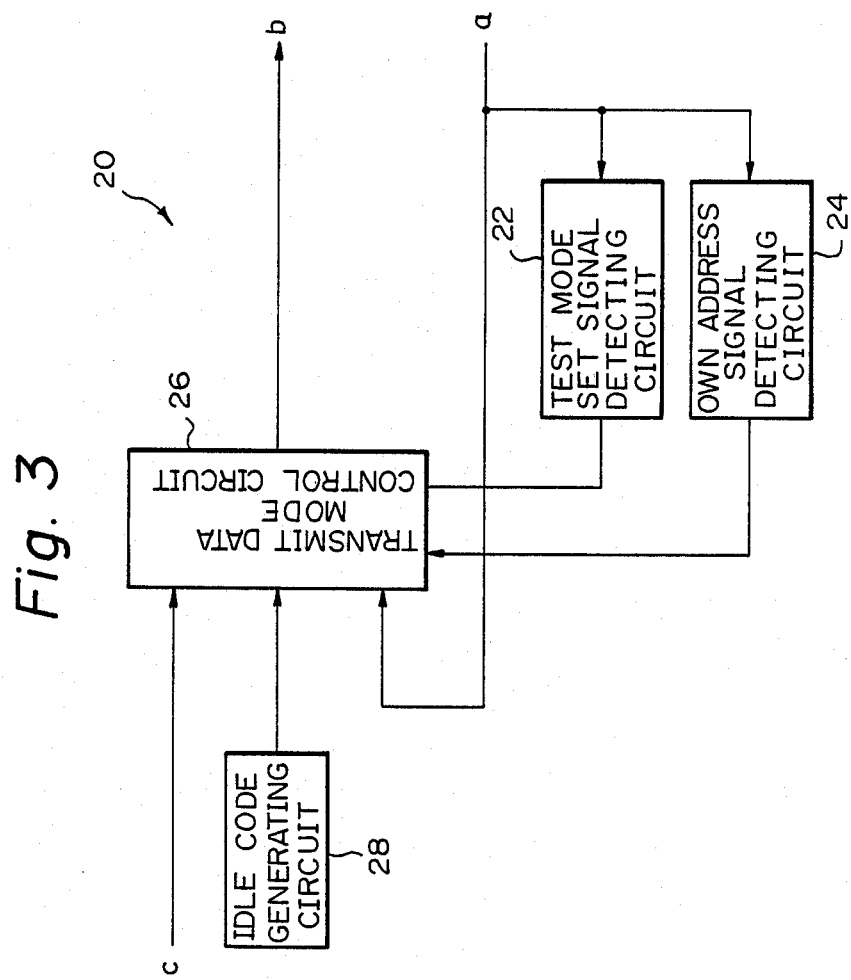
FIG. 3 is a block diagram of a remote test circuit embodying the present invention.
Figure 4:
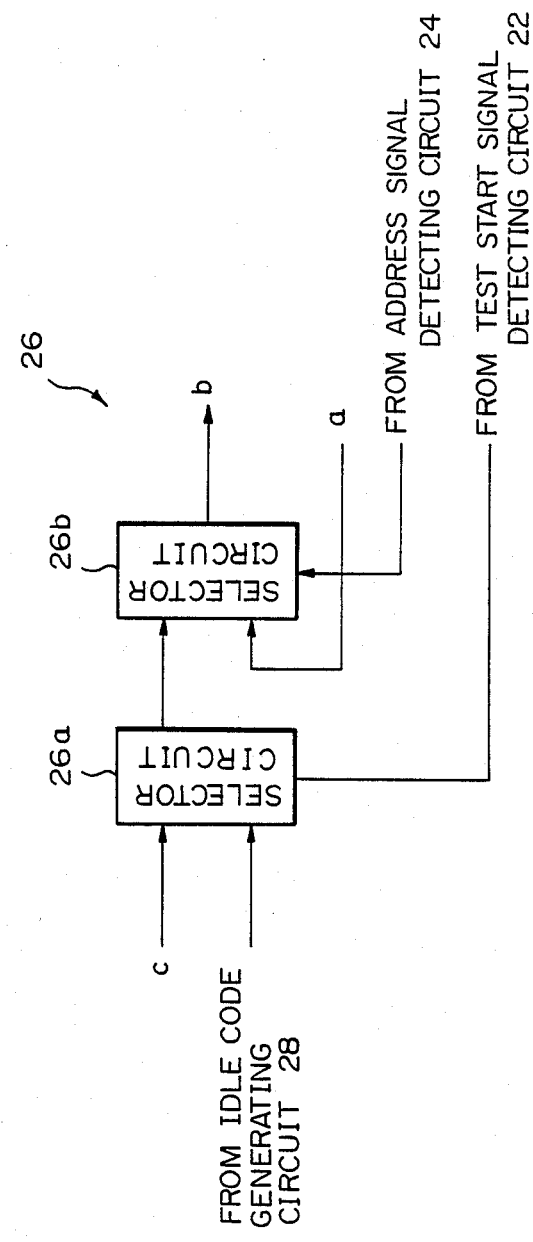
FIG. 4 is a diagram showing a transmit data mode control circuit of FIG. 3.

Referring to FIG. 3, a remote test circuit for a channel terminal embodying the present invention is shown and generally designated by the reference numeral 20. In this particular embodiment, the test is a return test in which data received by any DCE is returned as transmit data. The idle state of a DCE is represented by an idle signal which is comprised of a unique code and transmitted to the multi-junction unit 6. As shown, the remote test circuit 20 consists of a test start signal detecting circuit 22, an own address signal detecting circuit 24, a transmit data mode control circuit 26, and an idle code generating circuit 28. Each of the circuits 22 and 24 may be implemented with a pattern detecting circuit while the circuit 28 may be implemented with a fixed pattern generating circuit. As shown in FIG. 4, the circuit 26 is made up of two selector circuits 26a and 26b.

A received signal a is applied to the test start signal detecting circuit 22. As the circuit 22 detects a test start signal, the transmit data mode control circuit 26 selects the idle code and sends it as a transmit signal b. On the other hand, when the own address signal detecting circuit 24 has detected the same address signal as its own address, the transmit data mode control circuit 26 returns the received signal a as the transmit signal b, whereby a test mode is set up.

The embodiment shown and described is applicable to 1:N communication as will be described with reference to FIGS. 1 and 5A to 5F. The system of FIG. 1 is operated as previously described. FIGS. 5A to 5E show the contents of signals which are transmitted from the DCEs 1 to 5, respectively. Shown in FIG. 5F are contents of a signal received by the DCE 1. It is to be noted that in FIGS. 5A to 5F no consideration is given to the delays particular to the network and terminals. In the example shown in FIGS. 5A to 5F, initially a communication is held between the DTEs 1a and 3a, then a return test is performed between the DCEs 1 and 5, and then a communication is held again between the DTEs 1a and 3a. While the DTEs 1a and 3a are in communication, the DCEs 2, 4 and 5 are idle and, therefore, each transmits an idle code as represented by "IDLE" in FIGS. 5B, 5D or 5E. The DCE 1, on the other hand, transmits as the transmit signal b data c which is entered on the associated DTE 1a while receiving the incoming signal a, i.e. data from the DTE 3a.

Next, when the DCE 1 has delivered a test start signal as represented by "TEST SET" in FIG. 5A in order to effect a performance test, the signal is received by all the DCEs 2 to 5 via the multi-junction unit 6. This causes all the DCEs 2 to 5 to transmit the idle codes as shown in FIGS. 5B to 5E, based on the DCE control as stated above. Consequently, the communication between the DTEs 1a and 3a is interrupted. Then, the DCE 1 transmits an address signal particular to the DCE 5 as represented by "ADDRESS 5" in FIG. 5A, whereby only the DCE 5 sets up a return on the basis of the previously described control and becomes active. The other DCEs 2 to 4 continue to transmit the idle codes because their own addresses are not detected. Seeing that only the signal from the DCE 5 is in an active state, the multi-junction unit 6 sends only the signal from the DCE 5 to the DCE 1. As a result, a return path is completed between the DCEs 1 and 5 so that the test is performed with the test signal as represented by "TEST CODE" in FIG. 5A.

At the end of the test, the DCE 1 delivers a test mode reset signal as indicated by "TEST RST" in FIG. 5A in order to cancel the test modes of the DCEs 2 to 5. Then, the communication between the DCEs 1 and 3 is resumed.

In summary, it will be seen that the present invention provides a remote test circuit which is applicable even to multi-point connections such as 1:N (plural) communication.

Various modifications will become possible for those skilled in the art after receiving the teachings of the present disclosure without departing from the scope thereof.

What is claimed is:

1. A communication system comprising:
   a data center having a master data terminal and a data channel end connected to said master data terminal;
   a multi-junction unit for distributing data from said data center to a plurality of channels and feeding data form said plurality of channels to said data center; and
   multiple channel terminals each being connected to a respective one of said channels and including a slave data channel end which is connected to said multi-junction unit and is provided with an apparatus for setting up a return path between said channel terminal and said data center, and a slave data terminal for interchanging data with said slave data channel;
   wherein said apparatus for setting up a return path comprises:
   test start signal detecting means for detecting a start signal sent from said data center to produce a test start detection signal;
   an address signal detecting means for detecting an address which is identical with an address from address signals sent from said data center and producing an address detection signal; and
   control means for supplying an idle code to said slave data terminal in response to the test start detection signal and for connecting an output of said multi-junction unit to said slave terminal in response to the address detection signal.

2. A communication system as claimed in claim 1, wherein said test start signal detecting means comprises a pattern detecting circuit.

3. A communication system as claimed in claim 2, wherein said address signal detecting means comprises a pattern detecting circuit.

4. A communication system as claimed in claim 1, wherein said control means comprises:
   first selector means responsive to the test start detection signal for selecting one of an output from said slave data terminal and the idle code; and
   second selector means responsive to the address detection signal for selecting one of an output of said first selecting means and an output of said multi-junction unit.

* * * * *